United States Patent
Cox

(12) 
(10) Patent No.: US 6,626,337 B1
(45) Date of Patent: Sep. 30, 2003

(54) VEHICLE REFUSE CONTAINER

(76) Inventor: Terry Cox, 19212 53rd Ct. NE., Lake Forest Park, WA (US) 98155

( * ) Notice: Subject to any disclaimer, the term of this patent is extended or adjusted under 35 U.S.C. 154(b) by 0 days.

(21) Appl. No.: 09/917,163

(22) Filed: Jul. 27, 2001

(51) Int. Cl.[7] .................................................. B60R 7/00
(52) U.S. Cl. ......................... 224/275; 224/928; 383/8; 383/111
(58) Field of Search ................................ 224/275, 928; 296/37.8, 37.15; 297/188.18, 188.2; 383/8, 111, 122

(56) References Cited

U.S. PATENT DOCUMENTS

| | | | | |
|---|---|---|---|---|
| 2,061,302 A | * | 11/1936 | Egler | 297/188.18 |
| 2,761,481 A | * | 9/1956 | Boatwright | 383/22 |
| 2,778,554 A | * | 1/1957 | Porkola | 224/928 |
| 2,906,478 A | | 9/1959 | Merrick | |
| 2,920,670 A | * | 1/1960 | Mohlmann | 383/9 |
| 3,133,690 A | * | 5/1964 | Lui | 383/106 |
| 3,598,297 A | | 8/1971 | Welch | |
| 3,608,712 A | * | 9/1971 | Savoie | 206/525 |
| 4,154,383 A | | 5/1979 | Honatzis | |
| 4,235,350 A | | 11/1980 | Valentino | |
| 4,240,480 A | * | 12/1980 | Strobel | 383/13 |
| 4,577,903 A | * | 3/1986 | Wells | 224/407 |
| 5,012,963 A | * | 5/1991 | Rosenbaum | 224/407 |
| 5,031,808 A | | 7/1991 | Dolenc | |
| D321,772 S | | 11/1991 | Johnson | |
| 5,226,576 A | | 7/1993 | Ellsworth | |
| 5,246,190 A | * | 9/1993 | Swirkal | 224/928 |
| 5,362,153 A | * | 11/1994 | Lu | 224/928 |
| 5,526,924 A | * | 6/1996 | Klutznick | 383/111 |
| 5,927,800 A | * | 7/1999 | Stallworth | 383/111 |
| 6,149,229 A | * | 11/2000 | Dillon et al. | 297/188.2 |

* cited by examiner

Primary Examiner—Nathan J. Newhouse

(57) ABSTRACT

A vehicle refuse container for providing a convenient and more aesthetically pleasing refuse container for a vehicle. The vehicle refuse container includes a container including a front panel, a back panel, and a pair of side panels. A top edge of the container defines an opening for accessing and interior of the container. Each of the panels comprises a flexible material. A first loop is attached to the container. A second loop is attached to the container and spaced from the first loop. The armrests of vehicle chairs are extending through the loops such that the container is suspended between a pair of adjacent chairs.

5 Claims, 3 Drawing Sheets

VEHICLE REFUSE CONTAINER

BACKGROUND OF THE INVENTION

1. Field of the Invention

The present invention relates to refuse containers and more particularly pertains to a new vehicle refuse container for providing a convenient and more aesthetically pleasing refuse container for a vehicle.

2. Description of the Prior Art

The use of refuse containers is known in the prior art. More specifically, refuse containers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,031,808; U.S. Pat. No. 4,235,350; U.S. Pat. No. 5,226,576; U.S. Pat. No. 4,154,383; U.S. Pat. No. 3,598,297; U.S. Pat. No. 2,906,478; and U.S. Des. Pat. No. 321,772.

While these devices fulfill their respective, particular objectives and requirements, the aforementioned patents do not disclose a new vehicle refuse container. The inventive device includes a container including a front panel, a back panel, and a pair of side panels. A top edge of the container defines an opening for accessing and interior of the container. Each of the panels comprises a flexible material. A first loop is attached to the container. A second loop is attached to the container and spaced from the first loop. The armrests of vehicle chairs are extending through the loops such that the container is suspended between a pair of adjacent chairs.

In these respects, the vehicle refuse container according to the present invention substantially departs from the conventional concepts and designs of the prior art, and in so doing provides an apparatus primarily developed for the purpose of providing a convenient and more aesthetically pleasing refuse container for a vehicle.

SUMMARY OF THE INVENTION

In view of the foregoing disadvantages inherent in the known types of refuse containers now present in the prior art, the present invention provides a new vehicle refuse container construction wherein the same can be utilized for providing a convenient and more aesthetically pleasing refuse container for a vehicle.

The general purpose of the present invention, which will be described subsequently in greater detail, is to provide a new vehicle refuse container apparatus and method which has many of the advantages of the refuse containers mentioned heretofore and many novel features that result in a new vehicle refuse container which is not anticipated, rendered obvious, suggested, or even implied by any of the prior art refuse containers, either alone or in any combination thereof.

To attain this, the present invention generally comprises a container including a front panel, a back panel, and a pair of side panels. A top edge of the container defines an opening for accessing and interior of the container. Each of the panels comprises a flexible material. A first loop is attached to the container. A second loop is attached to the container and spaced from the first loop. The armrests of vehicle chairs are extending through the loops such that the container is suspended between a pair of adjacent chairs.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not. depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle refuse container apparatus and method which has many of the advantages of the refuse containers mentioned heretofore and many novel features that result in a new vehicle refuse container which is not anticipated, rendered obvious, suggested, or even implied by any of the prior art refuse containers, either alone or in any combination thereof.

It is another object of the present invention to provide a new vehicle refuse container which may be easily and efficiently manufactured and marketed.

It is a further object of the present invention to provide a new vehicle refuse container which is of a durable and reliable construction.

An even further object of the present invention is to provide a new vehicle refuse container which is susceptible of a low cost of manufacture with regard to both materials and labor, and which accordingly is then susceptible of low prices of sale to the consuming public, thereby making such vehicle refuse container economically available to the buying public.

Still yet another object of the present invention is to provide a new vehicle refuse container which provides in the apparatuses and methods of the prior art some of the advantages thereof, while simultaneously overcoming some of the disadvantages normally associated therewith.

Still another object of the present invention is to provide a new vehicle refuse container for providing a convenient and more aesthetically pleasing refuse container for a vehicle.

Yet another object of the present invention is to provide a new vehicle refuse container which includes a container including a front panel, a back panel, and a pair of side panels. A top edge of the container defines an opening for accessing and interior of the container. Each of the panels comprises a flexible material. A first loop is attached to the container. A second loop is attached to the container and spaced from the first loop. The armrests of vehicle chairs are extending through the loops such that the container is suspended between a pair of adjacent chairs.

Still yet another object of the present invention is to provide a new vehicle refuse container that looks attractive and is made from material which may match the interior of the vehicle.

Even still another object of the present invention is to provide a new vehicle refuse container that has a removable plastic liner that may have a hook and loop means therein for holding the liner in place.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
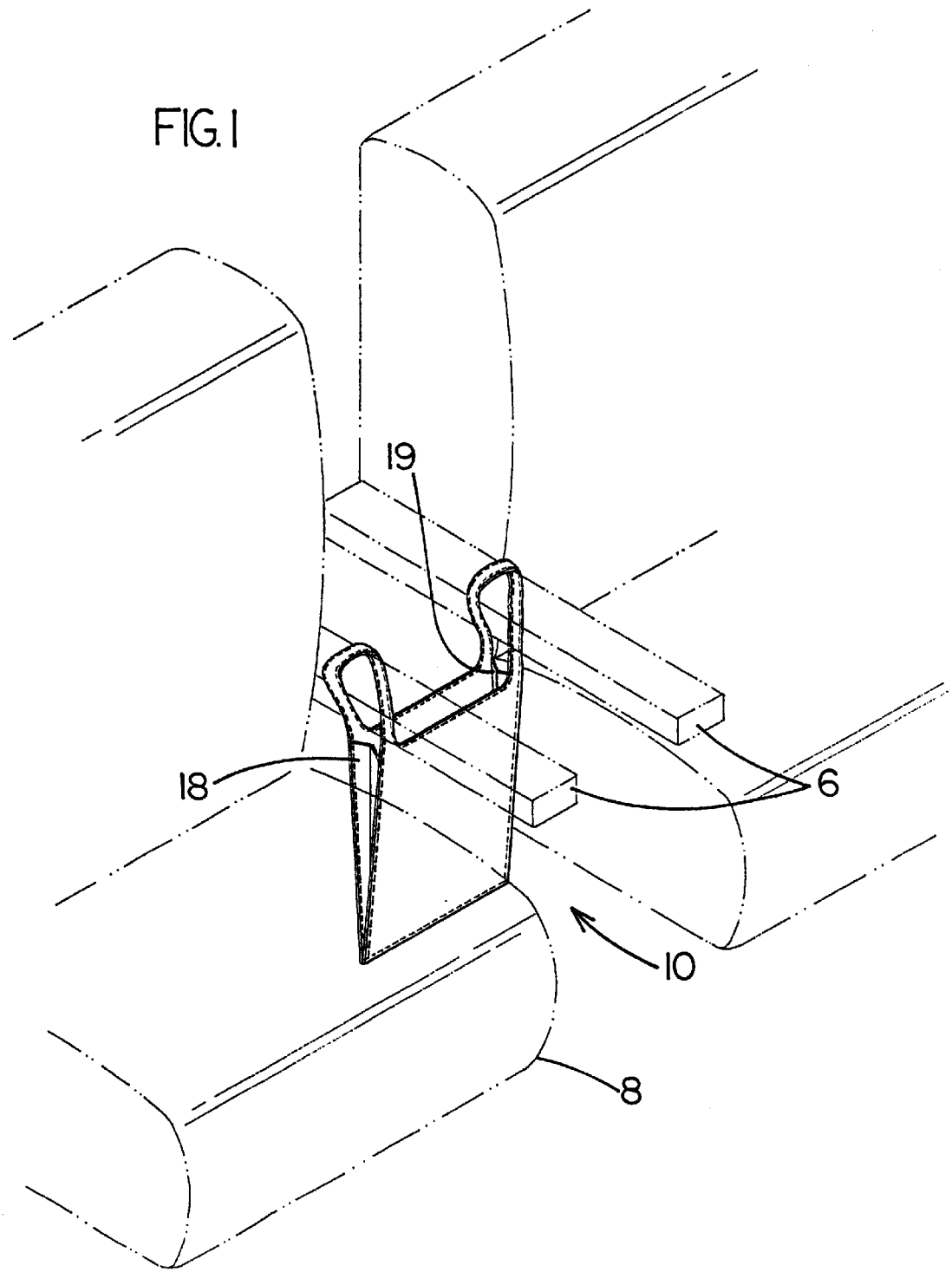
FIG. 1 is a schematic perspective view of a new vehicle refuse container according to the present invention.
Figure 2:
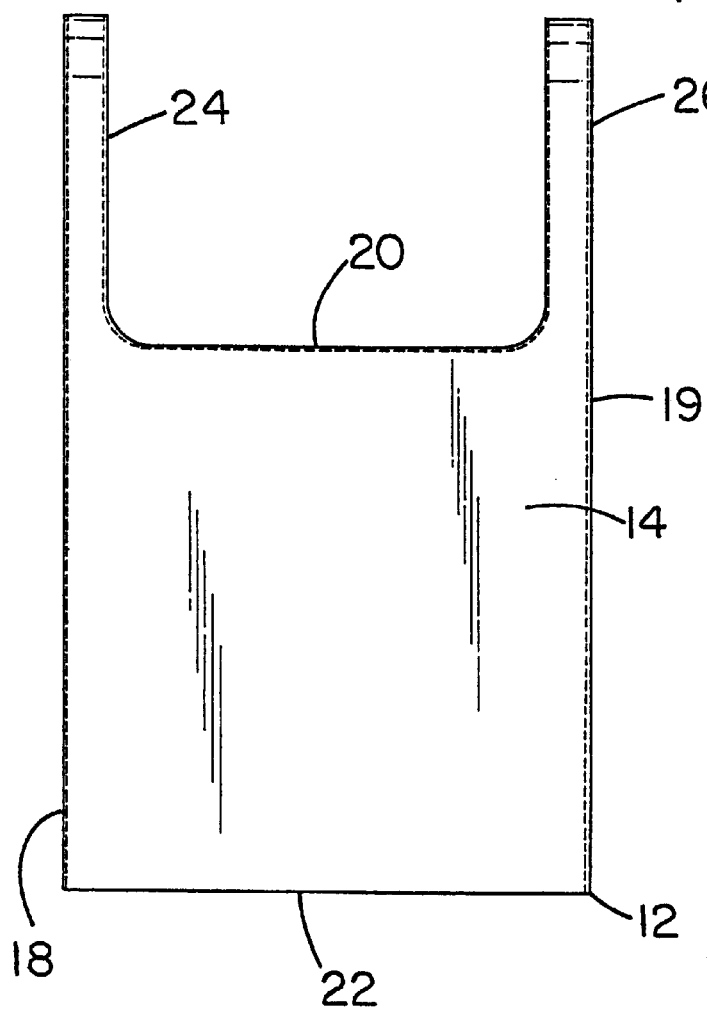
FIG. 2 is a schematic front view of the present invention.
Figure 3:
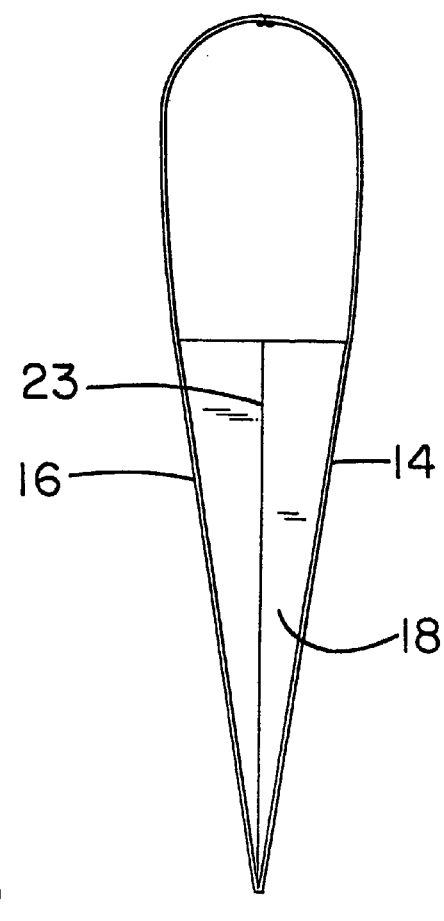
FIG. 3 is a schematic side view of the present invention.
Figure 4:
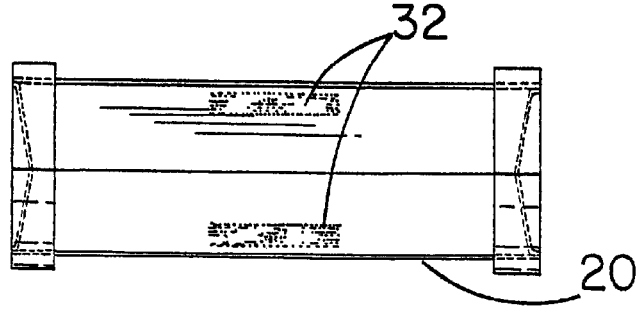
FIG. 4 is a schematic top view of the present invention.
Figure 5:
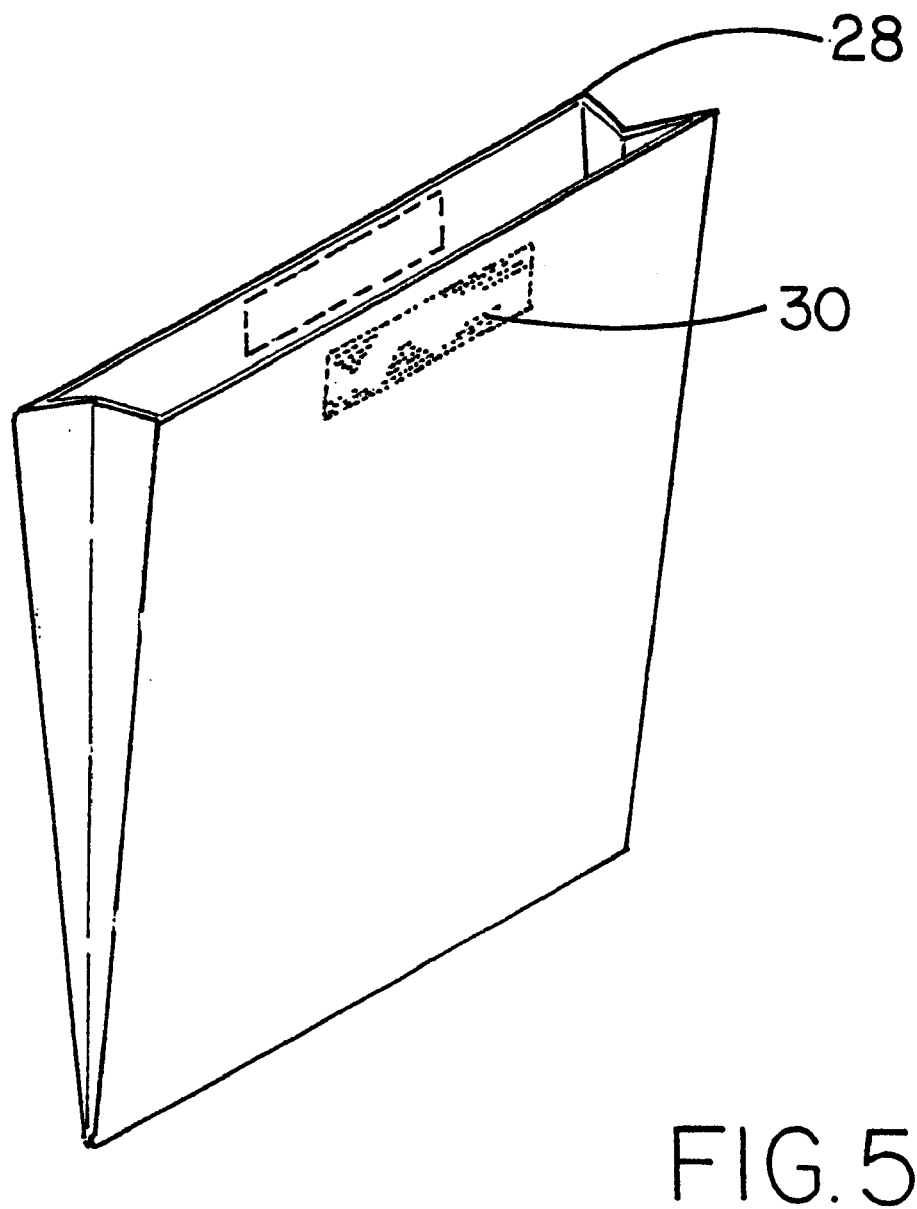
FIG. 5 is a schematic perspective view of the liner of the present invention.

With reference now to the drawings, and in particular to FIGS. 1 through 5 thereof, a new vehicle refuse container embodying the principles and concepts of the present invention and generally designated by the reference numeral 10 will be described.

As best illustrated in FIGS. 1 through 5, the vehicle refuse container 10 generally comprises a container portion 12 having a front panel 14, a back panel 16, and a pair of side panels 18, 19. A top edge 20 of the container 12 defines an opening for accessing and interior of the container 12. Each of the side panels 18 tapers from the top edge 20 to a bottom edge 22 such that the front 14 and back 16 panels are attached along a shared bottom edge 22 of the container 12. The side panels 18, 19 are pleated along a fold line 23 extending from the top edge 20 to the bottom edge 22. Each of the panels comprises a flexible material. The flexible material is preferably selected from the group consisting of a leather material, a cotton material and a vinyl material.

A first loop 24 includes a strap having a first end coupled to the front panel 14 and a second end coupled to the back panel 16. The first loop 24 is positioned generally adjacent to a first of the side panels 18.

A second loop 26 includes a strap having a first end coupled to the front panel 14 and a second end coupled to the back panel 16. The second loop 26 is positioned generally adjacent to a second of the side panels 19.

A bag 28 having a size and shape substantially identical to the container 12 is adapted for positioning in the container 12. The bag 28 preferably comprises a plastic material.

A securing means removably secures an outer surface of the bag 28 to an inner surface of the container 12. The securing means comprises a hook and loop securing means having a hook portion 30 coupled to the outer surface of the bag 28 and a loop portion 32 coupled to the inner surface of the container 12.

In use, each of a pair of armrests 6 is extended through one of the loops 24, 26 for holding the container 12 between the chairs 8 of a vehicle. Refuse is then positionable within the container 12. The bag 28 is positioned within the container 12 and is removable and disposable for keeping the inner surface of the container clean.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle interior receptacle device for positioning on a pair of chair armrests, said device comprising;

a container portion including a front panel, a back panel, and a pair of side panels, a top edge of said container defining an opening for accessing and interior of said container, each of said side panels tapering from said top edge to a bottom edge such that said front and back panels are attached along a shared bottom edge of said container, said side panels being pleated along a fold line extending from said top edge to said bottom edge, each of said panels comprising a flexible material, said flexible material being selected from the group consisting of a leather material, a cotton material and a vinyl material;

a first loop including a strap having a first end coupled to said front panel and a second end coupled to said back panel, said first loop being positioned generally adjacent to a first of said side panels;

a second loop including a strap having a first end coupled to said front panel and a second end coupled to said back panel, said second loop being positioned generally adjacent to a second of said side panels;

a bag having a size and shape substantially identical to said container, said bag comprising a plastic material;

a securing means removably secures an outer surface of said bag to an inner surface of said container, said securing means comprising a hook and loop securing means.

2. A vehicle interior receptacle device for positioning on a pair of chair armrests, said device comprising;

a container portion including a front panel, a back panel, and a pair of side panels, a top edge of said container defining an opening for accessing the interior of said container, each of said panels comprising a flexible material;

a first loop being attached to said container;

a second loop being attached to said container and spaced from said first loop;

a bag having a size and shape substantially identical to said container;

wherein said side panels are pleated along a fold line extending from said top edge to a bottom edge, and a securing means removably secures an outer surface of said bag to an inner surface of said container, said securing means comprising a hook and loop securing means attached to said bag and said inner surface of said container.

3. The vehicle interior receptacle device as in claim 2, wherein said each of said side panels taper from said top edge to a bottom edge such that said front and back panels are attached along a shared bottom edge of said container.

4. The vehicle interior receptacle device as in claim 2, wherein flexible material is selected from the group consisting of a leather material, a cotton material and a vinyl material.

5. The vehicle interior receptacle device as in claim 2, wherein said first loop is positioned generally adjacent to a first of said side panels and said second loop is positioned generally adjacent to a second of said side panels.

* * * * *